(12) United States Patent
Filloramo

(10) Patent No.: US 11,333,125 B2
(45) Date of Patent: May 17, 2022

(54) METHOD AND APPARATUS FOR A GRAVITY AND BUOYANCY ENGINE

(71) Applicant: Christopher Michael Filloramo, Clarksburg, MD (US)

(72) Inventor: Christopher Michael Filloramo, Clarksburg, MD (US)

( * ) Notice: Subject to any disclaimer, the term of this patent is extended or adjusted under 35 U.S.C. 154(b) by 239 days.

(21) Appl. No.: 16/801,461

(22) Filed: Feb. 26, 2020

(65) Prior Publication Data

US 2020/0191113 A1 Jun. 18, 2020

Related U.S. Application Data

(63) Continuation-in-part of application No. 15/847,905, filed on Dec. 19, 2017, now Pat. No. 10,584,687.

(51) Int. Cl.
*F03B 17/02* (2006.01)
*F03G 3/00* (2006.01)
*F03B 17/06* (2006.01)
*F03G 7/10* (2006.01)

(52) U.S. Cl.
CPC ............... *F03B 17/02* (2013.01); *F03G 3/00* (2013.01); *F03B 17/066* (2013.01); *F03G 7/10* (2013.01); *F05B 2210/401* (2013.01); *Y02E 10/20* (2013.01); *Y02E 10/30* (2013.01)

(58) Field of Classification Search
CPC ........ F03B 17/02; F03B 17/066; F03B 17/04; F03G 3/00; F03G 7/10; F05B 2210/401
See application file for complete search history.

(56) References Cited

U.S. PATENT DOCUMENTS

| | | | |
|---|---|---|---|
| 6,249,057 B1 * | 6/2001 | Lehet ...................... | F03B 17/02 290/1 R |
| 8,756,932 B2 * | 6/2014 | Pirincci .................. | H02K 53/00 60/496 |
| 9,745,952 B2 * | 8/2017 | Westmoreland ...... | F03B 17/005 |
| 2013/0168970 A1 * | 7/2013 | Grossman ............... | F03B 17/04 290/1 A |

* cited by examiner

*Primary Examiner* — Michael C Zarroli

(57) ABSTRACT

A gravity and buoyancy engine producing energy via a cyclical process of harnessed gravity and buoyancy has a gravity chamber, at least one air lock chamber, at least one electricity producing system, at least one buoyant object, and at least one vertical motion transfer assembly. The gravity chamber provides a zone for the buoyant object to engage the vertical motion transfer assembly as the buoyant object descends toward the air lock chamber. The vertical motion transfer assembly further transfers kinetic energy from the vertical motion of the buoyant object to the electricity generating system in order to provide useable electrical energy. The airlock chamber subsequently reintroduces the buoyant object into the buoyancy chamber to return said buoyant object to an elevated position and recycle through the gravity chamber.

15 Claims, 8 Drawing Sheets

METHOD AND APPARATUS FOR A GRAVITY AND BUOYANCY ENGINE

The current application is a continuation-in-part (CIP) application of the U.S. non-provisional application Ser. No. 15/847,905 filed on Dec. 19, 2017.

FIELD OF THE INVENTION

The present invention relates generally to the field of energy generation. Specifically, the present invention provides a means and method to generate useable electrical energy via a cyclical process harnessing both buoyancy and gravity at various stages of operation.

BACKGROUND OF THE INVENTION

The energy demands of modern humans are understood to be met primarily by means that pollute or otherwise damage the environment. Energy generation via the burning of fossil fuels produces manifold hazards both in immediate environmental degradation during extraction, refinement, and consumption and in the longer-term effects that the release of large quantities of greenhouse and toxic gasses may have on the atmosphere. To an appreciable extent nuclear power has supplanted fossil fuel electricity generation and avoided some of these shortcomings. However, the potential for catastrophic failures stemming from natural disasters, improper maintenance, improper storage and handling of fissile materials, and simple operator error cannot be ignored. Modern renewable sources of power show some promise, lacking the direct harmful effects of fossil fuels and lacking the potential for extreme eventualities presented by nuclear power. However, renewable sources are not yet reliable enough to satisfy a need for a consistent baseload of power generation, lacking the promise of consistent wind, sunlight, or sufficient battery storage capacity to bridge these low-production periods.

The present invention offers a means to generate clean, consistent electrical energy, without reliance on any form of fossil fuels or nuclear power. The present invention offers a means to harness the opposing forces of gravity and buoyancy in a continuous cycle to provide grid-scale production of power in a unitized, deployable package. The input materials ideally call for a series of Douglas fir logs, recycled plastic pontoons, or any suitably buoyant material in the proper dimensions to fit within a correspondingly scaled iteration of the present invention. Provided a suitable connection to a local grid, the present invention may produce useable electricity absent any additional consumable fuels, flowing water, sunlight, wind, or other limitations normally associated with grid-scale energy production.

DETAIL DESCRIPTIONS OF THE INVENTION

All illustrations of the drawings are for the purpose of describing selected versions of the present invention and are not intended to limit the scope of the present invention.

Figure 1:
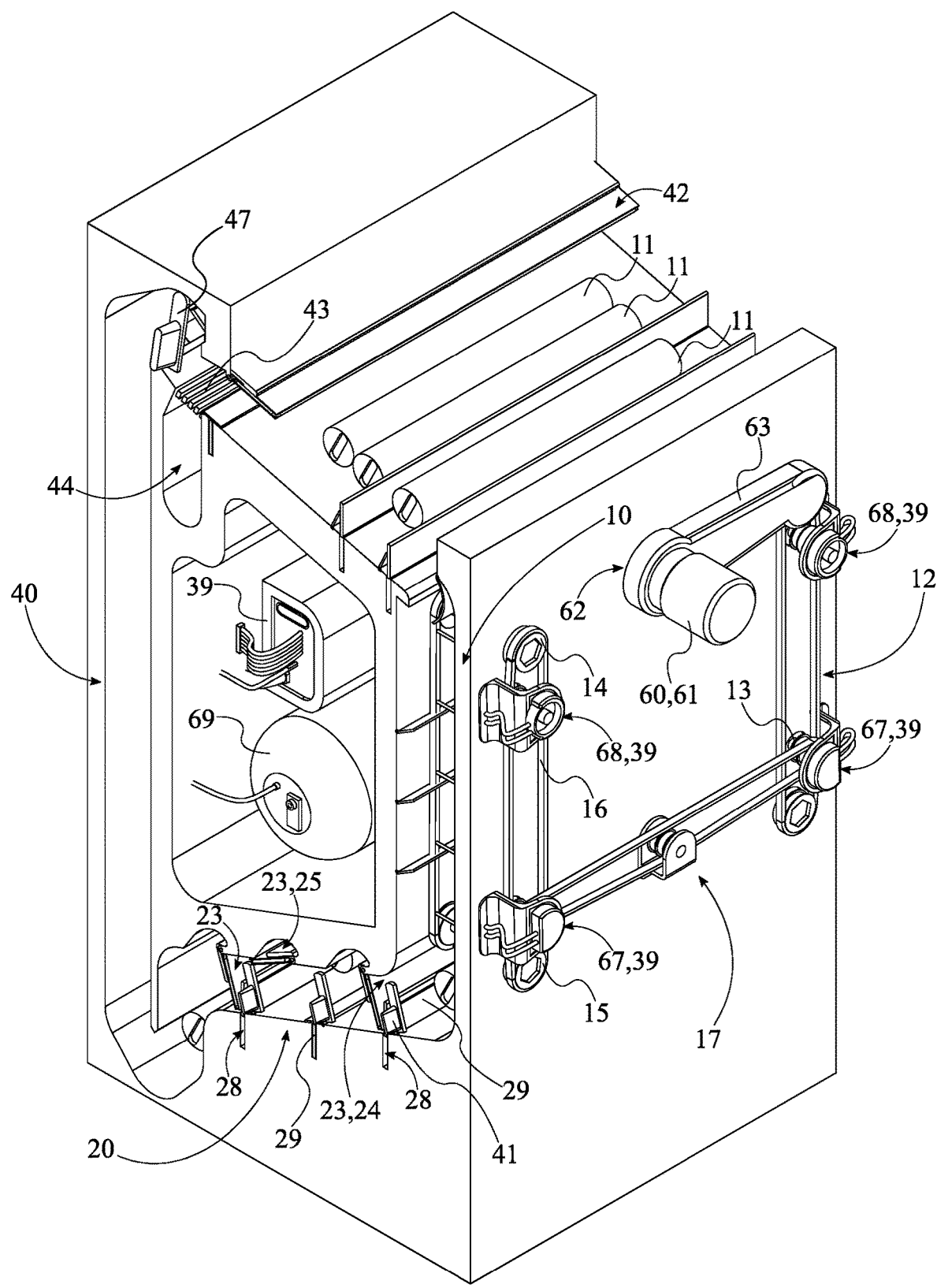
FIG. 1 is a perspective view of the present invention, wherein the present invention is illustrated in a partially exploded configuration.
Figure 2:
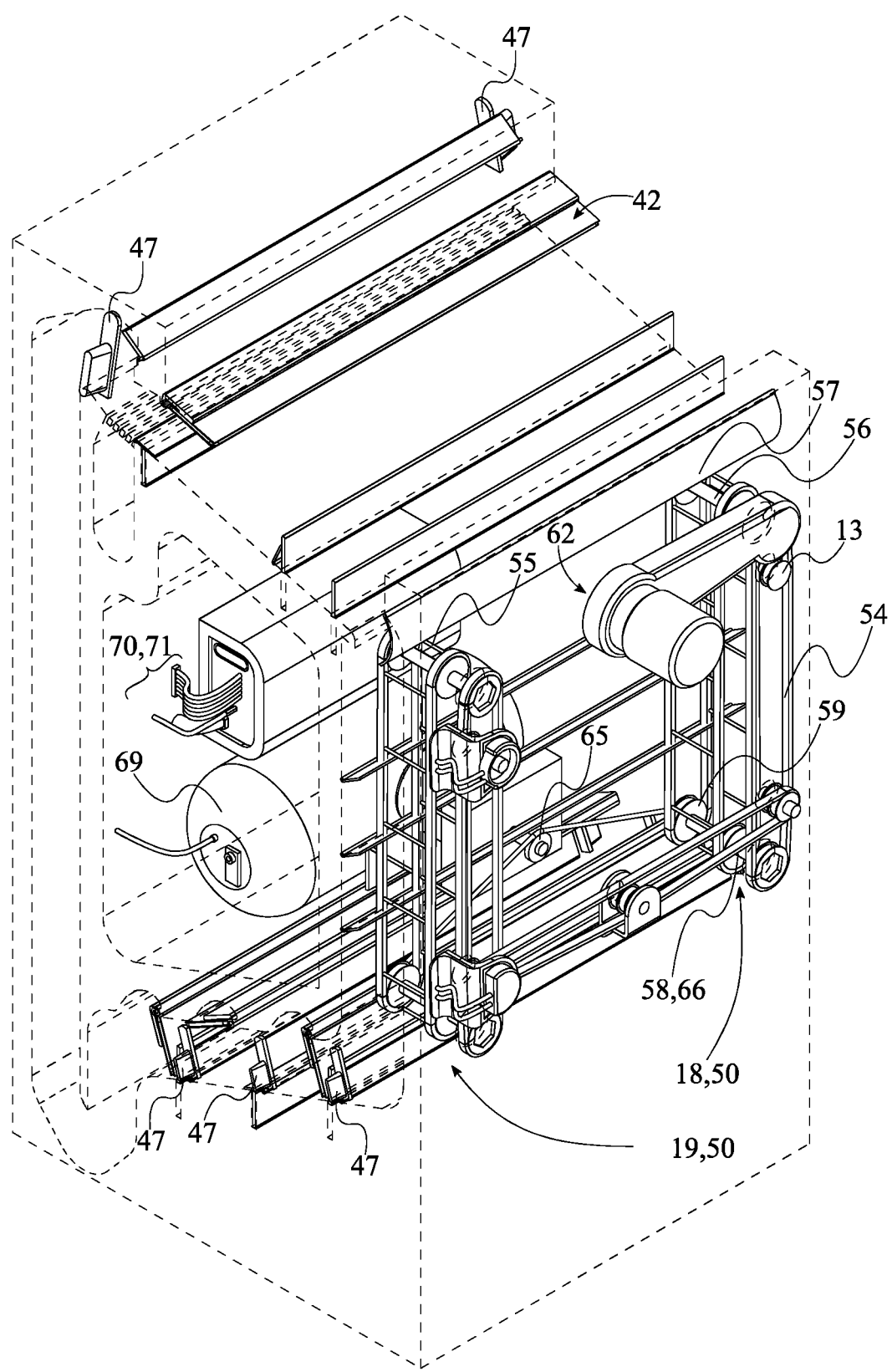
FIG. 2 is an alternate perspective view thereof, wherein the present invention is rendered as transparent to illustrate internal construction.
Figure 3:
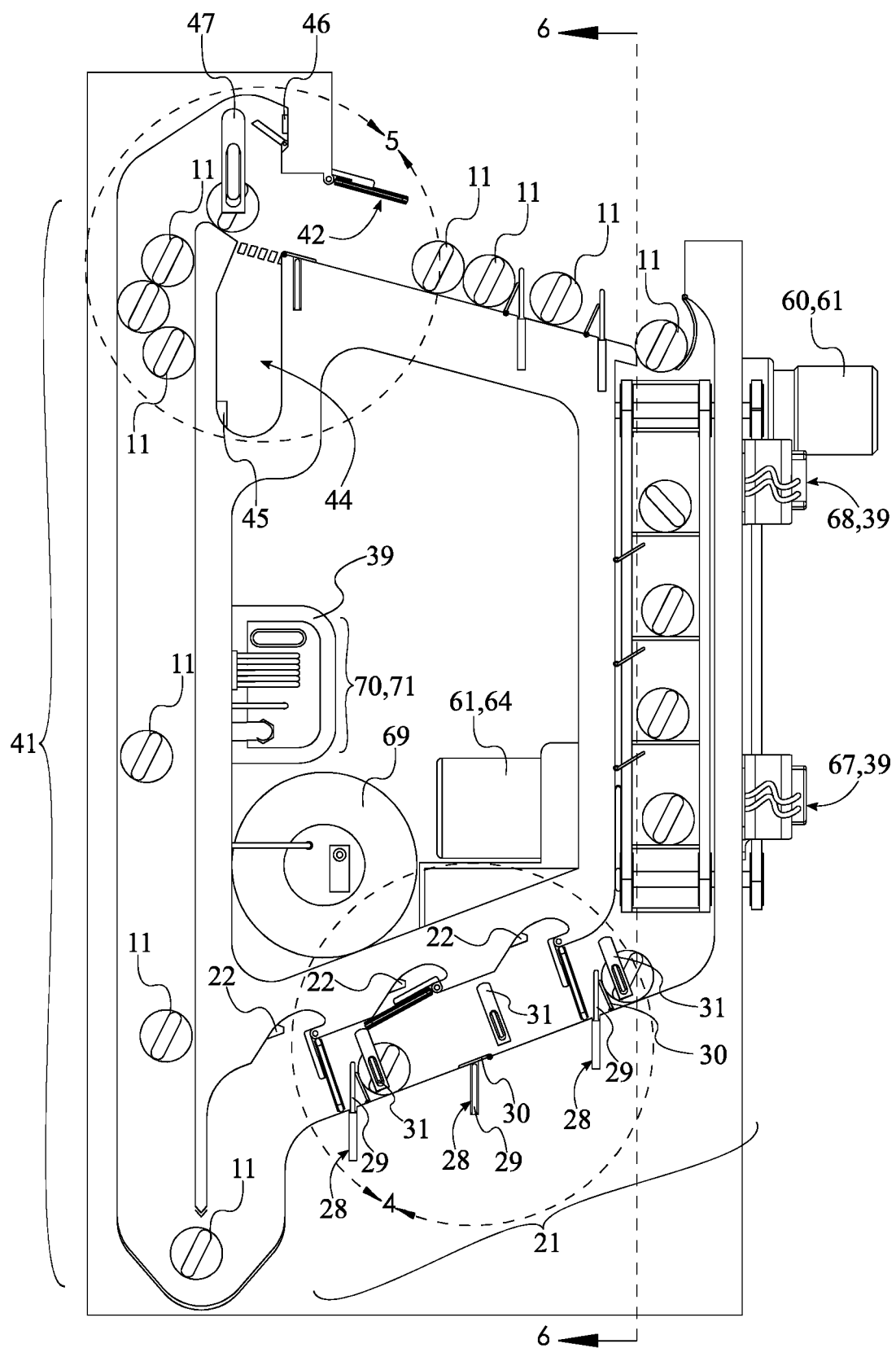
FIG. 3 is a left side elevational view thereof.
Figure 4:
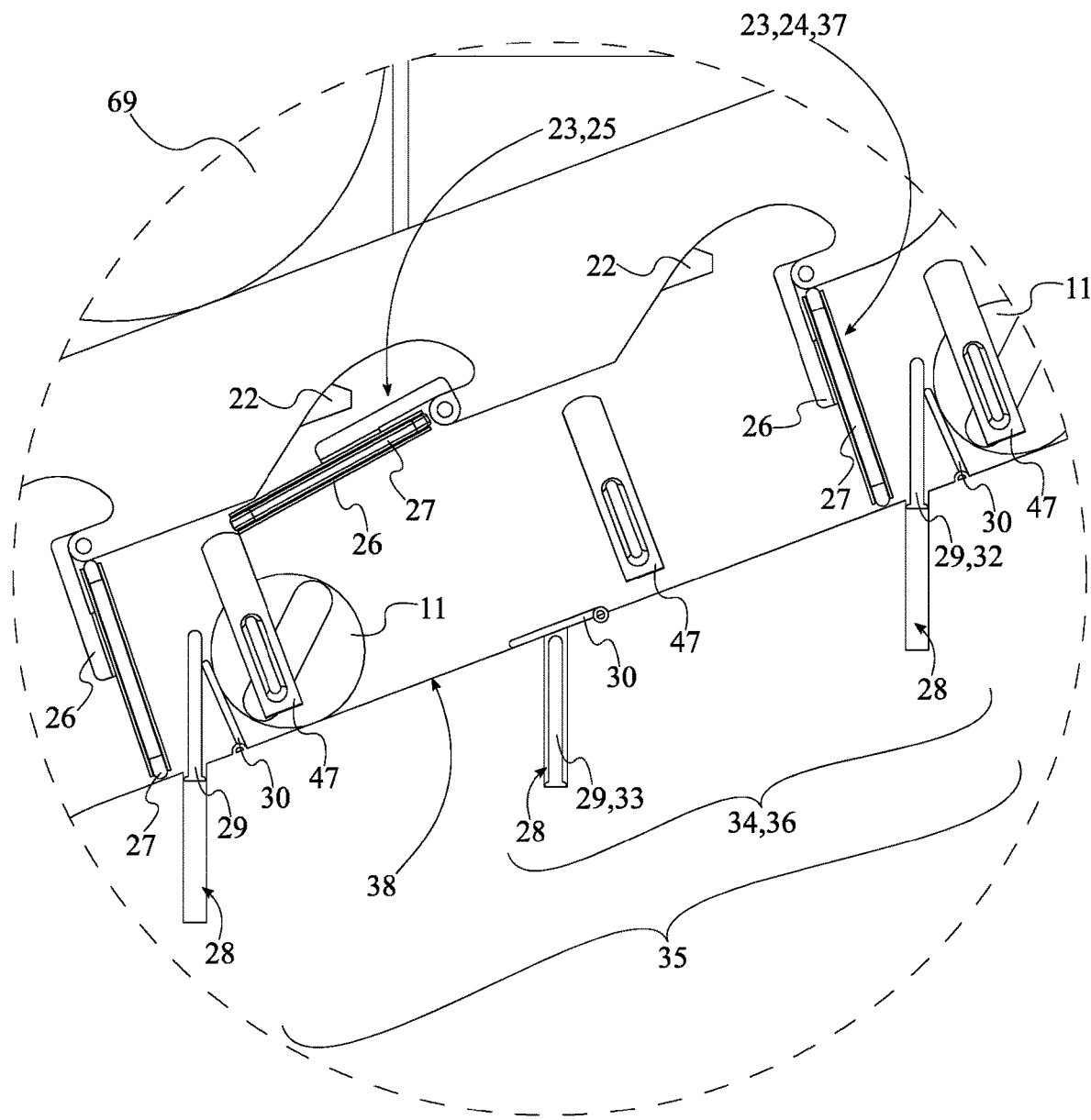
FIG. 4 is a detail view of area 4 in FIG. 3.
Figure 5:
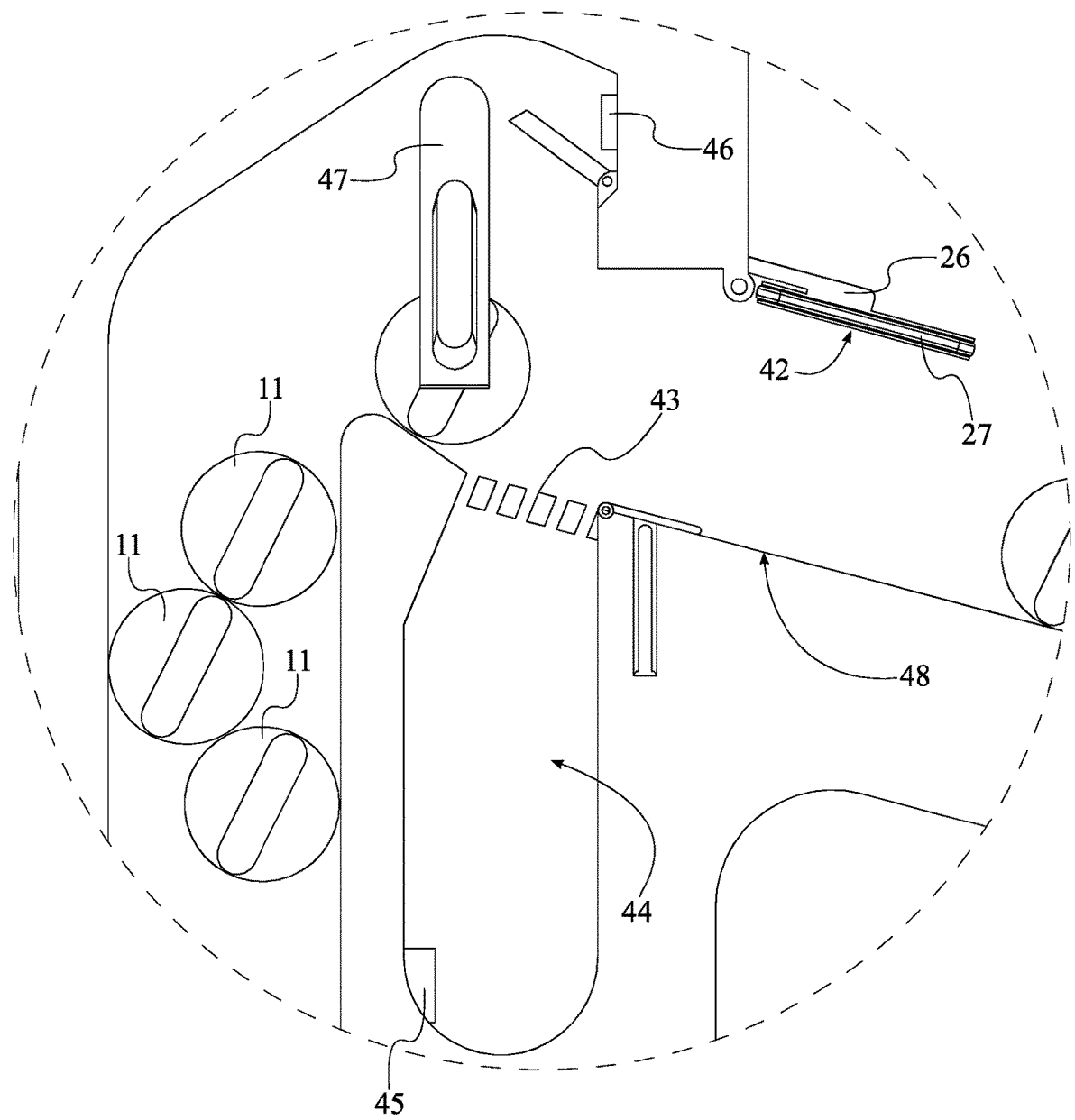
FIG. 5 is a detail view of area 5 in FIG. 3.
Figure 6:
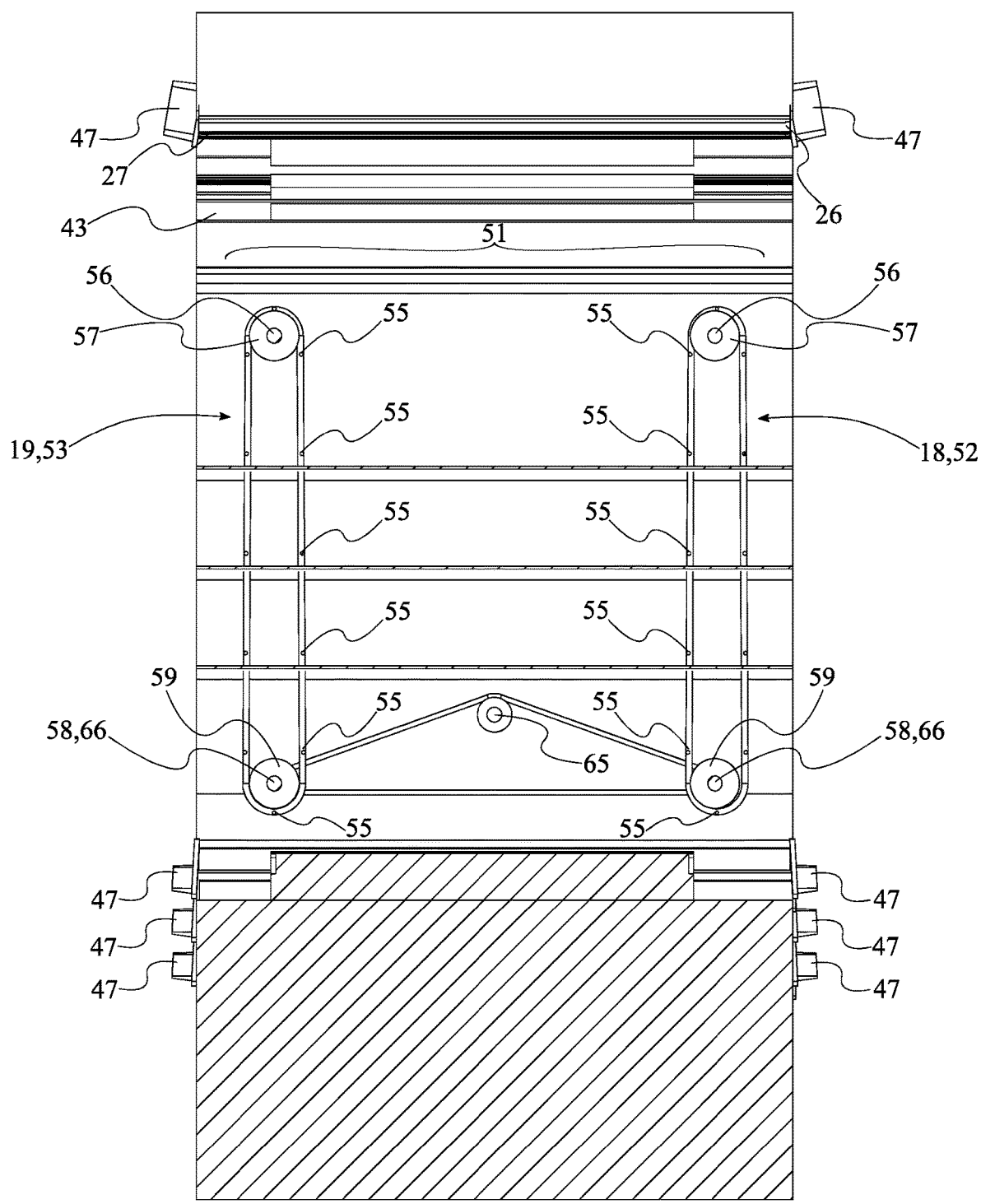
FIG. 6 is a sectional view taken along line 6-6 in FIG. 3.
Figure 7:
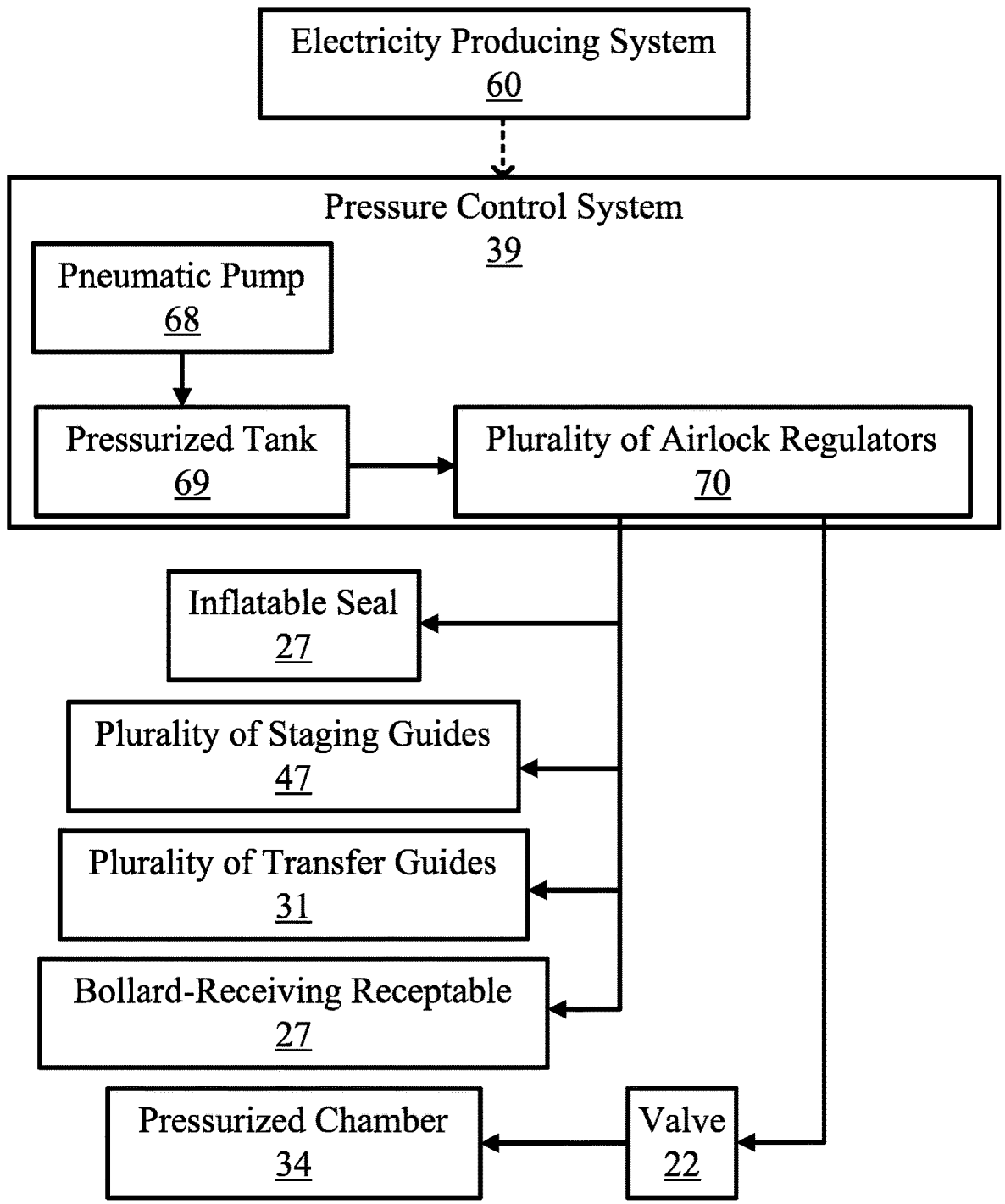
FIG. 7 is a schematic diagram of the pneumatic functions of the present invention, wherein fluid connections are indicated in solid-line and electrical connections are indicated in dashed-line.
Figure 8:
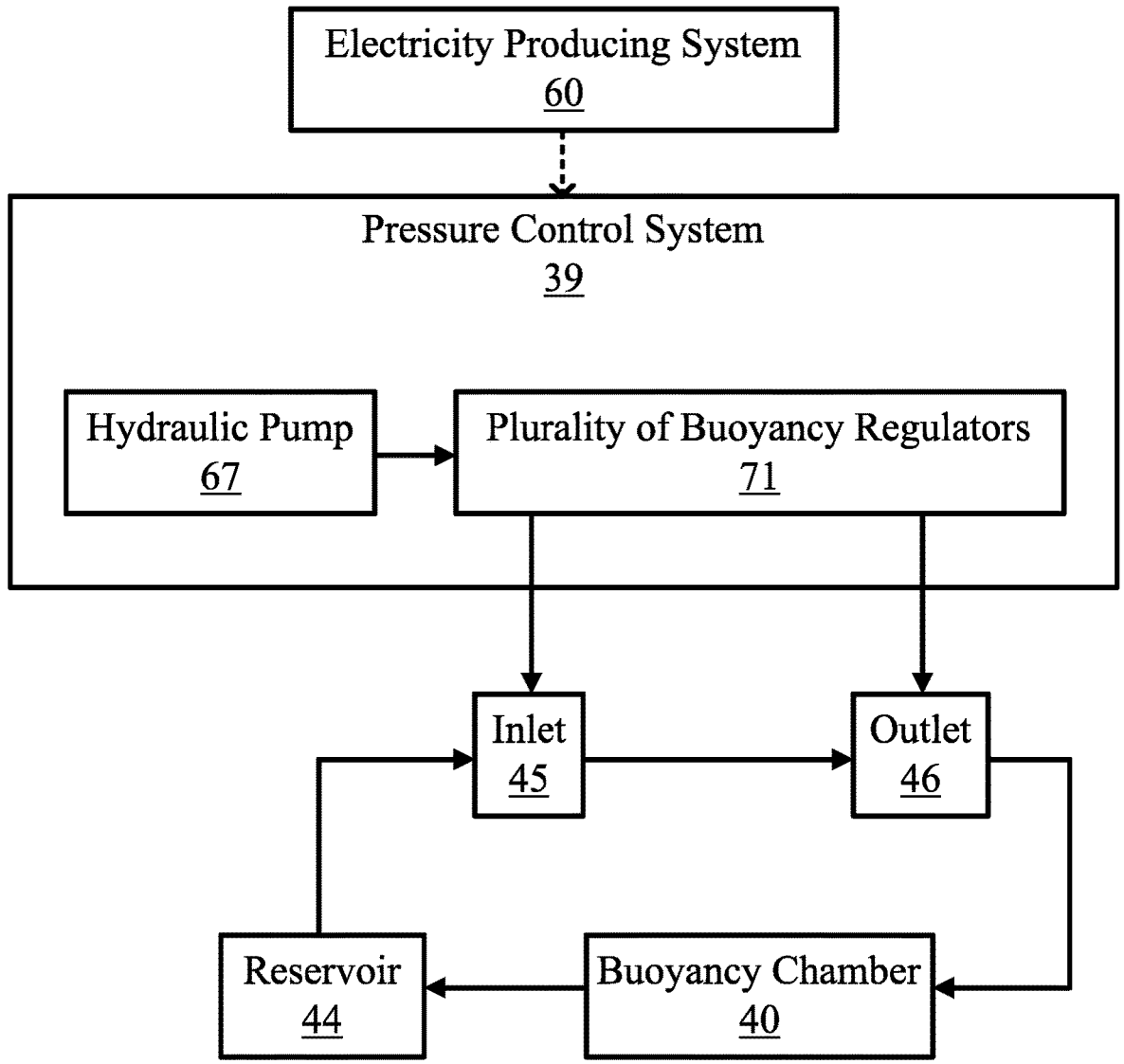
FIG. 8 is a schematic diagram of the hydraulic functions of the present invention, wherein fluid connections are indicated in solid-line and electrical connections are indicated in dashed-line.

In reference to FIG. 1 through 8, the present invention is a gravity and buoyancy engine. The present invention offers a means to generate clean, consistent electrical energy, without reliance on any form of fossil fuels or nuclear power. The present invention offers a means to harness the opposing forces of gravity and buoyancy in a continuous cycle to provide grid-scale production of power in a unitized, deployable package. The input materials ideally call for a series of Douglas fir logs, recycled plastic pontoons, or any suitably buoyant material in the proper dimensions to fit within a correspondingly scaled iteration of the present invention. Provided a suitable connection to a local grid, the present invention may produce useable electricity absent any consumable fuels, flowing water, sunlight, wind, or other limitations normally associated with grid-scale production.

The gravity and buoyancy engine provides a means to extract useable electrical energy by a cyclical process harnessing the opposing forces of buoyancy and gravity with specific structures and processes to be described herein. The gravity and buoyancy engine comprising a gravity chamber 10, at least one airlock chamber 20, a buoyancy chamber 40, at least one electricity producing system 60, at least one buoyant object 11, and at least one vertical motion transfer assembly 50. The gravity chamber 10 defines an enclosed space with suitable clearance for the buoyant object 11 to traverse therethrough without binding to the interior of the gravity chamber 10 or any exposed components of the vertical motion transfer assembly 50 therein. The gravity chamber 10 normally traverses into the airlock chamber 20, defining an area wherein the buoyant object 11 may be transferred between an ambient pressure area to a higher-pressure area as may be required to eventually maneuver the buoyant object 11 into the buoyancy chamber 40 without compromising the integrity of the buoyancy chamber 40 or flooding the airlock chamber 20 with any volume of fluid otherwise contained within the buoyancy chamber 40. Accordingly, the buoyancy chamber 40 provides a generally vertical column of fluid of greater density than the buoyant object 11 in fluid communication with the airlock chamber 20, whereby the buoyant object 11 will be returned to a position approaching the entrance of the gravity chamber 10 to repeat the a cycle through the present invention. It is specifically contemplated that the connection from the airlock chamber 20 to the buoyancy chamber 40 may provide a vertical drop terminating in a submerged angled facet such that the falling buoyant object 11 may more expediently traverse into the buoyancy chamber 40, i.e. that the buoyant object will deflect off of the interior of the buoyancy chamber post-immersion and enter the fluid column contained therein. The vertical motion transfer assembly 50 ideally defines a continuous elevator system enabling the unfettered onload and offload of the buoyant object 11 at the top and bottom ends of the elevator, respectively. The vertical motion transfer assembly 50 is arranged within the gravity chamber 10 to capture the force of the buoyant object 11 falling downward therethrough. More specifically, the electricity producing system 60 is linked to the vertical motion transfer assembly 50 to be provided operating power, i.e. the kinetic energy of the buoyant object 11 under gravity rendered available by the vertical motion transfer assembly 50.

The vertical motion transfer assembly 50 further comprises at least one link chain 54, at least one first shaft 56, a first gear 57, at least one second shaft 58, a second gear 59, and a buoyant object chain ledge 55. The link chain 54 defines a continuously connected chain of suitable material quality to support the weight of at least one buoyant object 11 engaged to the vertical motion transfer assembly 50 at the buoyant object chain ledge 55. Accordingly, the buoyant object chain ledge 55 is contemplated to protrude from the link chain 54 to provide a capture area for the buoyant object 11 at the upper end of the vertical motion transfer assembly 50 that will automatically be withdrawn at the lower end as the link chain 54 recirculates within the gravity chamber 10. The first gear 57 is connected to the first shaft 56 and the second gear 59 is connected to the second shaft 58. Further, the link chain 54 is rotatably connected to the first gear 57 and the second gear 59. Thusly, the first shaft 56 and the second shaft 58 provide rotating axles for the link chain 54 to recirculate about at opposing ends of the gravity chamber 10.

Accordingly, the electricity producing system 60 is rotatably linked to the first shaft 56, whereby the recirculation of the link chain 54 will rotate the first shaft 56 to provide operating power to the electricity producing system 60. The link chain 54 is further contemplated to directly engage the first gear 57 and the second gear 59 to prevent slippage of the vertical motion transfer assembly 50 if configured to load multiple instances of the buoyant object 11 simultaneously.

According to one embodiment, the present invention further comprises a transmission 63 and the electricity producing system 60 is a generator 61. Additionally, the generator 61 comprises a generator input shaft 62. The transmission 63 defines any mechanism as may be understood by a skilled individual to provide a means of governing the output rotational rate of a mechanism relative to an input rotational rate. In this embodiment, the transmission 63 will be operatively connected between the first shaft 56 of the vertical motion transfer assembly 50 and a generator input shaft 62, thereby enabling an operator of the present invention to achieve and maintain an optimal rotational rate of the generator input shaft 62 for power generation irrespective of the rate of rotation of the first shaft 56. Moderation of torsional forces may also be achieved by this means, whereby maximal torque of the first shaft 56 may be converted to maximal rotational velocity of the generator input shaft 62.

In at least one alternate embodiment, the at least one electricity producing system 60 comprises an alternator 64 and an alternator input pulley 65. Additionally, the vertical motion transfer assembly 50 further comprises at least one alternator belt. To enable fullest usage of this embodiment, the alternator belt is rotatably connected between the alternator input pulley 65 and a desired shaft 66 selected from the group consisting of the first shaft 56 and the second shaft 58. The linkage of the alternator 64 to the vertical motion transfer assembly 50 in this way will enable electricity required for the initial operation of the present invention to be drawn directly from the vertical motion transfer assembly 50 for use during startup or secondary operations wherein direct power from the generator 61 may be unsuitable.

It is further considered that the vertical motion transfer assembly 50 further comprises at least one accessory belt drive 12. The accessory belt drive 12 defines a secondary driven linkage between the vertical motion transfer assembly 50 and any installations or portions of the present invention that may extract useable power from the operation of the vertical motion transfer assembly 50. Accordingly, the present invention further comprises a pressure control system 39, and a pump input shaft 13. The pressure control system 39 in this embodiment provides a means for generating and vectoring an atmospheric pressure differential as is understood to be required for the operation of the airlock chamber 20 and the buoyancy chamber 40 in various stages of the functionality of the present invention. In a general interpretation, the pressure control system 39 is understood to be operatively connected with all components described herein as may be required to fully operate the present invention by the methods described, including continuous adjustment of the recirculation rate of multiple instances of the buoyant object 11 through the present invention to maximize efficacy of all interrelated processes described herein. More specifically, the accessory belt drive 12 comprises at least one first sheave 14, at least one second sheave 15, and at least one accessory belt 16. The first sheave 14 and the second sheave 15 collectively provide a means of mounting the accessory belt 16 to the vertical motion transfer assembly 50, ideally individually defining a channeled disk fixed to rotating elements of said vertical motion transfer assembly 50. Accordingly, the first sheave 14 is mounted to the first shaft 56, opposite the first gear 57 across the first shaft 56 and the second sheave 15 is mounted to the second shaft 58, opposite the second gear 59 across the second shaft 58. The accessory belt 16 is connected between the first sheave 14 and the second sheave 15 to provide a means of synchronizing the rotational velocity of both respective components while simultaneously enabling the transfer of rotational energy to the pump input shaft 13. In this configuration, the pump input shaft 13 is rotatably connected between the accessory belt 16 and the pressure control system 39, thereby providing operating power to the pressure control system 39.

In one functional embodiment, the at least one vertical motion transfer assembly 50 is a plurality of vertical motion transfer assemblies 51. wherein the plurality of vertical motion transfer assemblies 51 are distributed across the gravity chamber 10 such that the buoyant object 11 may be suspended between the buoyant object chain ledge 55 of an arbitrary transfer assembly 52 and the buoyant object chain ledge 55 of an adjacent transfer assembly 53, wherein the arbitrary transfer assembly 52 and the adjacent transfer assembly 53 are from the plurality of vertical motion transfer assemblies 51. This configuration may be superior to a single vertical motion transfer assembly 50 due to the contrarotating plurality of vertical motion transfer assemblies 51 as the buoyant object chain ledge 55 progresses tangent to the first gear 57 and second gear 59, respectively. More specifically, the buoyant object chain ledge 55 of the arbitrary transfer assembly 52 and the adjacent transfer assembly 53 are brought together at the upper end of the gravity chamber 10 to effectively engage the buoyant object 11 and subsequently separated at the lower end of the gravity chamber 10 to disengage or eject the buoyant object 11 from the gravity chamber 10.

The present invention may additionally comprise a plurality of tensioner pulley assemblies 17, wherein each of the plurality of tensioner pulley assemblies 17 is rotatably connected in between a corresponding arbitrary transfer assembly 18 and a corresponding adjacent transfer assembly 19, wherein the corresponding arbitrary transfer assembly 18 and the corresponding adjacent transfer assembly 19 are from the plurality of vertical motion transfer assemblies 51. The plurality of tensioner pulley assemblies 17 defines a series of fixed or adjustable pivots about which the ductile components of the present invention may be drawn to ensure appropriate operating tension along said components to enable effective purchase on any driving and driven components of such mobile assemblies. More specifically, the plurality of tensioner pulley assemblies 19 ensures that the corresponding arbitrary transfer assembly 18 and the corresponding adjacent transfer assembly 19 are rotationally bound to one another to prevent over- or under-rotation of either element. This configuration may forestall any mismatch or misalignment or any supported or interconnected components, i.e. the buoyant object 11 or the electricity producing system 60.

Relevant to the displacement of the buoyant object 11 between the gravity chamber 10 and the buoyancy chamber 40, the airlock chamber 20 further comprises a transfer channel 21, at least one pressurized chamber 34, the pressure control system 39, at least one valve 22, and a plurality of airlock doors 23. The transfer channel 21 provides a passage for the buoyant object 11 to traverse the pressurized chamber 34 into the buoyancy chamber 40, including various operable components intended to meter the govern the progress of said buoyant object 11 therethrough. The pressurized chamber 34 defines a zone in fluid communication with the pressure control system 39 through the valve 22 wherein local atmospheric pressure may be controllably incremented and decremented to maintain the integrity of the buoyancy chamber 40 during operation of the present invention, said increments and decrements to be handled by the pressure control system 39 as previously outlined. Accordingly, the plurality of airlock doors 23 is configured to sequentially open and close to maintain the integrity of the pressurized zone therein, including containing the buoyant object 11 during various stages of operation. More specifically, the pressurized chamber 34 is delineated by a first door 24 and a second door 25, wherein the first door 24 and the second door 25 are from the plurality of airlock doors 23. In at least one functional embodiment the sequential arrangement of the first door 24 and the second door 25 may be repeated indefinitely to create additional instances of the pressurized chamber 34 to enable a more gradual transition between local ambient pressure and an equivalent pressure to the lower end of the buoyancy chamber 40.

The plurality of airlock doors 23 may further comprise a panel 26 and an inflatable seal 27. The panel 26 defines a structure that may substantially occlude the transfer channel 21 when configured to a closed position. The inflatable seal 27 provides an expandable gasket mounted perimetrically around the panel 26 in fluid communication with the pressure control system 39. In this configuration each of the plurality of doors are hingedly connected to a lateral sidewall of the transfer channel 38, with specific consideration given to a hinge construction that does not impede the expansion of the inflatable seal 27 match the internal dimensions of the transfer channel 21. During an opening cycle of an airlock door the inflatable seal 27 may be deflated to allow the pressurized chamber 34 and the local atmosphere to equalize before the panel 26 is swung to an open position. In reverse, the panel 26 may be swung to a closed position and the inflatable seal 27 may be expanded to fully enclose the pressurized zone.

In some embodiments, the pressure control system 39 may further comprise at least one hydraulic pump 67, at least one pneumatic pump 68, at least one pressurized tank 69, a plurality of airlock regulators 70, and a plurality of buoyancy regulators 71. The hydraulic pump 67 and the pneumatic pump 68 are both independently operatively coupled to the vertical motion transfer assembly 50, wherein the vertical motion transfer assembly 50 provides the operating power for both components. The independent and redundant construction of these components enables the compartmentalization of malfunctions and maintenance to ensure that operation of the present invention is not affected by periodic non-functionality of any of these essential elements. More specifically, the hydraulic pump 67 is in fluid communication with the buoyancy chamber 40 to enable the cyclical movement of fluid during various stages of operation. Similarly, the pneumatic pump 68 is in fluid communication with the pressurized tank 69 to enable the storage of high-pressure atmosphere for use within the present invention. Accordingly, the pressurized tank 69 is in fluid communication with the airlock chamber 20 through the plurality of airlock regulators 70 and the buoyancy chamber 40 through the plurality of buoyancy regulators 71, whereby the application of pressurized air may be employed to specific effect as required by adjustable operating standards.

To further improve the sequential flow of the buoyant object 11 through the transfer channel 21, the airlock chamber 20 may further comprise at least one bollard-receiving receptacle 28, at least one chamber bollard, and at least one chamber hatch 30. The bollard-receiving receptacle 28 defines a hollow cutout normally traversing into the lateral sidewall of the transfer channel 38 to enable the chamber bollard 29 to be shifted from a position impeding the passage of a buoyant object 11 to a position enclosed within the bollard-receiving receptacle 28 and the chamber hatch 30. Accordingly, the chamber bollard 29 defines a deployable blocking structure slidably mounted within the bollard-receiving receptacle 28, ideally extended and retracted via pressurized air. The principal effect of the chamber bollard 29 is to prevent the buoyant object 11 from partially entering the pressurized chamber 34 such that the first door 24 may jam against said buoyant object 11 while attempting to close. To prevent this malfunction, the bollard-receiving receptacle 28 is positioned offset from the first door 24 along the transfer channel 21 to interrupt the movement of the buoyant object 11 either within the pressurized chamber 34 or prior to entering the pressurized chamber 34. The chamber hatch 30 is hingedly mounted to the lateral sidewall of the transfer channel 38 such that the chamber hatch 30 is positioned over the bollard-receiving receptacle 28 when closed. This configuration will enable the chamber hatch 30 to act as a bridge over the otherwise exposed bollard-receiving receptacle 28, thereby preventing the buoyant object 11 from binding in the open cavity. In an instance that the chamber bollard 29 is extended the chamber hatch 30 will be deflected aside to permit the protrusion of the chamber bollard 29. In the ideal embodiment of the present invention, the present invention will comprise a first plurality of bollards 32 and a second plurality of bollards 33 slidably mounted onto the lateral sidewall of the transfer channel 38. Further, the at least one pressurized chamber 34 is a plurality of pressurized chambers 35 wherein the plurality of pressurized chambers 35 is serially distributed along the transfer channel 21. Each of the first plurality of bollards 32 is positioned offset from the first door 24 of a corresponding chamber 36, wherein the corresponding chamber 36 is from the plurality of pressurized chambers 35. Each of the second plurality of bollards 33 is subsequently positioned opposite to the second door 25, across the first door 24 of the corresponding chamber 36. Additionally, each of the second plurality of bollards 33 is positioned in between the first door 24 and the second door 25 of the corresponding chamber 36. This configuration will enable an operator of the present invention to arrest the movement of the buoyant object 11 prior to entering the corresponding chamber 36 to limit the flow of successive instances of the buoyant object 11 and prevent the airlock chamber 20 from becoming jammed. More succinctly, an instance of the chamber bollard 29, bollard-receiving receptable, and chamber hatch 30 will be positioned ahead of each instance of the first door 24 throughout the transfer channel 21 to enable the effective management of sequential instances of the buoyant object 11 traversing the airlock chamber 20.

In another embodiment of the present invention, the airlock chamber 20 may comprise a plurality of transfer guides 31 mounted onto the lateral sidewall of the transfer channel 38. The plurality of transfer guides 31 individually defines actuated paddles or bumpers that serve to center the buoyant object 11 in the transfer channel 21 to prevent jams due to the orientation of the buoyant object 11 becoming crooked relative to said transfer channel 21. Similar to the chamber bollard 29, the plurality of transfer guides 31 is ideally extended and retracted by pressurized air provided via the pressure control system 39 as outlined above. To enable the effective manipulation of the buoyant object 11 as described, the plurality of transfer guides 31 is distributed along the transfer channel 21 and configured to protrude into the pressurized chamber 34. To avoid interference with the plurality of airlock doors 23, the plurality of transfer guides is positioned offset from the plurality of airlock doors 23 along the transfer channel 21.

The buoyancy chamber 40 further comprises a buoyancy channel 41, a staging door 42, a drainage platform 43, a reservoir 44, an inlet 45, and an outlet 46. The buoyancy channel 41, similar to the transfer channel 21, provides a passage for the buoyant object 11 to continue circulation through the present invention. The buoyancy channel 41 is necessarily filled with a fluid of greater density than the buoyant object 11, thereby enabling the buoyant object 11 to rise through the buoyancy channel 41. The staging door 42 defines a similar component to any one of the plurality of airlock doors 23, wherein the staging door 42 may be operatively closed and opened to maintain the integrity of the buoyancy chamber 40 or release a buoyant object 11, respectively. The staging door 42 is specifically contemplated to be hingedly mounted between the buoyancy channel and the gravity chamber 10, with the drainage platform 43 being positioned within the buoyancy channel opposite the gravity chamber 10 across the staging door. The drainage platform 43 provides a means of reducing the volume of fluid in the buoyancy channel 41 adjacent to the staging door 42 to permit the ejection of said buoyant object 11 without reducing the overall fluid in circulation through the buoyancy channel 41. The reservoir 44 is in fluid communication with the drainage platform 43, thereby providing an area separate from the buoyancy chamber 40 to retain any displaced fluid in an instance where the staging door 42 is opened. To enable the reintroduction of fluid to the buoyancy channel 41, the inlet 45 is integrated into the reservoir 44 and the outlet 46 is integrated into the buoyancy chamber 40, the outlet 46 is positioned offset from the drainage platform 43, across the buoyancy channel 41. In this configuration, the reservoir 44 is in fluid communication with the buoyancy channel 41 through the inlet 45 and the outlet 46 to enable the operation of the staging door 42 as described, i.e. to enable the controlled drainage or replenishment of the fluid in the buoyancy channel 41 to permit the buoyant object 11 to be cycled into and out of the buoyancy chamber 40.

The buoyancy chamber 40 may further comprise a plurality of staging guides 47. The plurality of staging guides 47 defines a series of operable manipulators similar in form and function to the plurality of transfer guides 31 described previously. In this embodiment the plurality of staging guides is mounted onto a lateral sidewall of the buoyancy channel 48, protruding into the buoyancy channel 41. To enable the continuous alignment of the buoyant object 11 within the buoyancy channel 41 the plurality of staging guides 47 is further distributed along the buoyancy channel 41. Also similar to the plurality of transfer guides 31, the plurality of staging guides 47 is positioned offset from the staging door 42 along the buoyancy channel 41 to prevent the any interference between the simultaneous operation of the plurality of staging guides 47 and the staging door 42. As outlined above the pressure system ideally provides the operating power to the plurality of staging guides 47 and the staging door 42 in a similar fashion to the plurality of transfer guides 31 and the plurality of airlock doors 23, i.e. introducing controlled volumes of high-pressure air to each component in sequence to enable the continuous operation of the present invention.

To elaborate on the cyclical process related to the operation of the present invention, the buoyant object 11 may begin in a position and configuration to enter the gravity chamber 10 and vertical motion transfer assembly 50 via gravity after passing through the buoyancy chamber 40, wherein the buoyancy chamber 40 has released the buoyant object 11 at an elevated position relative to the upper end of the vertical motion transfer assembly 50. The buoyant object 11 will ideally engage the vertical motion transfer assembly 50 as the buoyant object chain ledge 55 is cycled into position to receive said buoyant object 11. In response to the buoyant object 11 engaging the vertical motion transfer assembly 50, the buoyant object 11 traverses downward through the gravity chamber 10 toward the airlock chamber 50, thereby providing motive force to the vertical motion transfer assembly 50. It is further contemplated that the entrance of the gravity chamber 10 may be blocked a gravity door, wherein the gravity door may be operably coupled to a plurality of switches linearly dispersed along the gravity chamber 10. In this configuration, the timing of the present invention may be affected by an instance of the buoyant object 11 engaged to the vertical motion transfer assembly 50 sequentially contacting the plurality of switches. The arrangement and effect of the individual entities defined within the plurality of switches are understood to be variable in multiple configurations of the present invention, but at least one configuration will trigger the gravity door to permit an instance of the buoyant object 11 to enter the gravity chamber 10 and engage the vertical motion transfer assembly 50 as described. Corresponding to the movement of the vertical motion transfer assembly 50 caused by the buoyant object 11 moving toward the airlock chamber 50, the vertical motion transfer assembly 50 may further provide operating power to the electricity producing system 60. Subsequently, the buoyant object 11 is configured to enter the air lock chamber via gravity after passing through the gravity chamber 10 and disengaging the vertical motion transfer assembly

50, said disengagement understood to be an inverse process of the engagement occurring as a result of the cyclical movement of the vertical motion transfer assembly 50. Upon entry into the airlock chamber 50 the buoyant object 11 rolls along the air lock chamber via gravity to open an airlock door 37, wherein said airlock door 37 is biased to a closed position after the passage of said buoyant object 11 therethrough. The buoyant object 11 is subsequently cycled through repeated iterations of the airlock chamber 50 to incrementally increase the ambient pressure until the buoyant object 11 may be introduced to the buoyancy chamber 40 via gravity. After entering the buoyancy chamber 40, the buoyant object 11 will ascend the column of fluid in the buoyancy chamber 40 to return to a suitable position to reengage the vertical motion transfer assembly 50 and repeat the cyclical process as described.

Although the invention has been explained in relation to its preferred embodiment, it is to be understood that many other possible modifications and variations can be made without departing from the spirit and scope of the invention as hereinafter claimed.

What is claimed is:

1. A gravity and buoyancy engine comprising:
   a gravity chamber;
   at least one air lock chamber;
   a buoyancy chamber;
   at least one electricity producing system;
   at least one buoyant object;
   at least one vertical motion transfer assembly;
   the air lock chamber comprising a transfer channel; at least one pressurized chamber, a pressure control system, at least one valve, and a plurality of airlock doors;
   the air lock chamber being in communication in between the gravity chamber and the buoyancy chamber;
   the vertical motion transfer assembly positioned within the gravity chamber;
   at least one electricity producing system linked to the vertical motion transfer assembly;
   the buoyant object being mounted to the vertical motion transfer assembly;
   the transfer channel being connected in between the vertical motion transfer assembly and the buoyancy chamber;
   the pressurized chamber being positioned within the transfer channel;
   the pressurized chamber being delineated by a first door and a second door, wherein the first door and the second door are from the plurality of airlock doors; and
   the pressure control system being in fluid communication with the pressurized chamber through the valve.

2. The gravity and buoyancy engine as claimed in claim 1 comprising:
   the vertical motion transfer assembly further comprising at least one link chain, at least one first shaft, a first gear, at least one second shaft, a second gear, and a buoyant object chain ledge;
   the first shaft being rotatably connected with the electricity producing system;
   the first gear being connected with the first shaft;
   the second gear being connected with the second shaft;
   the link chain being rotatably connected in between the first gear and the second gear; and
   the buoyant object chain ledge being connected with the link chain.

3. The gravity and buoyancy engine as claimed in claim 2 comprising:
   a transmission;
   the at least one electricity producing system being a generator;
   the generator further comprising a generator input shaft; and
   the transmission being operatively connected between the first shaft and the generator input shaft, wherein the transmission governs the rotation of the generator input shaft relative to the rotation of the first shaft.

4. The gravity and buoyancy engine as claimed in claim 2 comprising:
   the at least one electricity producing system comprising an alternator and an alternator input pulley;
   the vertical motion transfer assembly further comprising at least one alternator belt; and
   the alternator belt being rotatably connected between the alternator input pulley and a desired shaft selected from the group consisting of the first shaft and the second shaft.

5. The gravity and buoyancy engine as claimed in claim 2 comprising:
   the vertical motion transfer assembly further comprising at least one accessory belt drive;
   a pressure control system;
   a pump input shaft;
   the accessory belt drive comprising at least one first sheave, at least one second sheave, and at least one accessory belt;
   the first sheave being mounted to the first shaft, opposite the first gear across the first shaft;
   the second sheave being mounted to the second shaft opposite the second gear across the second shaft;
   at least one accessory belt being rotatably connected between the first sheave and the second sheave; and
   the pump input shaft being rotatably connected between the accessory belt and the pressure control system.

6. The gravity and buoyancy engine as claimed in claim 1 comprising:
   the at least one vertical motion transfer assembly being a plurality of vertical motion transfer assemblies;
   the plurality of vertical motion transfer assemblies being distributed across the gravity chamber; and
   the buoyant object being suspended in between the buoyant object chain ledge of an arbitrary transfer assembly and the buoyant object ledge of an adjacent transfer assembly, wherein the arbitrary transfer assembly and the adjacent transfer assembly are from the plurality of vertical motion transfer assemblies.

7. The gravity and buoyancy engine as claimed in claim 6 comprising:
   a plurality of tensioner pulley assemblies; and
   each of the plurality of tensioner pulley assemblies being rotatably connected in between a, wherein the corresponding arbitrary transfer assembly and the corresponding adjacent transfer assembly are from the plurality of vertical motion transfer assemblies.

8. The gravity and buoyancy engine as claimed in claim 1 comprising:
   each of the plurality of airlock doors comprising a panel and an inflatable seal;
   each of the plurality of airlock doors being hingedly connected to a lateral sidewall of the transfer channel;
   the inflatable seal being perimetrically mounted around the panel; and
   the inflatable seal being in fluid communication with the pressure control system.

9. The gravity and buoyancy engine as claimed in claim 1 comprising:

the pressure control system comprising at least one hydraulic pump, at least one pneumatic pump, at least one pressurized tank, a plurality of airlock regulators, and a plurality of buoyancy regulators;

the hydraulic pump being operatively coupled to the vertical motion transfer assembly, wherein the vertical motion transfer assembly provides the operating power for the hydraulic pump;

the hydraulic pump being in fluid communication with the buoyancy chamber;

the pneumatic pump being operatively coupled to the vertical motion transfer assembly, wherein the vertical motion transfer assembly provides the operating power for the pneumatic pump;

the pressurized tank being in fluid communication with the pneumatic pump;

the pressurized tank being in fluid communication with the airlock chamber through the plurality of airlock regulators; and the pressurized tank being in fluid communication with the buoyancy chamber through the plurality of buoyancy regulators.

10. The gravity and buoyancy engine as claimed in claim 1 comprising:

The airlock chamber further comprising at least one bollard-receiving receptacle, at least one chamber bollard, and at least one chamber hatch;

the bollard-receiving receptacle normally traversing into a lateral sidewall of the transfer channel;

the bollard-receiving receptacle being positioned offset from the first door along the transfer channel;

the chamber bollard being slidably mounted within the bollard-receiving receptacle;

the chamber hatch being hingedly mounted to the lateral sidewall of the transfer channel; and the chamber hatch being positioned over the bollard-receiving receptacle.

11. The gravity and buoyancy engine as claimed in claim 1 comprising:

the airlock chamber further comprising a plurality of transfer guides;

the plurality of transfer guides being mounted onto a lateral sidewall of the transfer channel;

the plurality of transfer guides being distributed along the transfer channel;

the plurality of transfer guides protruding into the pressurized chamber; and the plurality of transfer guides being positioned offset from the plurality of airlock doors along the transfer channel.

12. The gravity and buoyancy engine as claimed in claim 8 comprising:

a first plurality of bollards;

a second plurality of bollards;

the at least one pressurized chamber being a plurality of pressurized chambers;

the plurality of pressurized chambers being serially distributed along the transfer channel;

the plurality of first bollards and the plurality of second bollards being slidably mounted onto the lateral sidewall of the transfer channel;

each of the first plurality of bollards being positioned offset from the first door of a corresponding chamber, wherein the corresponding chamber is from the plurality of pressurized chambers;

each of the second plurality of bollards being positioned opposite to the second door, across the first door of the corresponding chamber;

each of the second plurality of bollards being positioned offset from the second door of the corresponding chamber; and each of the second plurality of bollards being positioned in between the first door and the second door of the corresponding chamber.

13. The gravity and buoyancy engine as claimed in claim 1 comprising:

the buoyancy chamber further comprising a buoyancy channel, a staging door, a drainage platform, a reservoir, an inlet, and an outlet;

the staging door being hingedly mounted between the buoyancy channel and the gravity chamber, the drainage platform being positioned withing the buoyancy channel, opposite the gravity chamber across the staging door;

the reservoir being in fluid communication with the drainage platform;

the inlet being integrated into the reservoir;

the outlet being integrated into the buoyancy channel;

the outlet being positioned offset from the drainage platform, across the buoyancy channel; and the reservoir being in fluid communication with the buoyancy channel through the inlet and the outlet.

14. The gravity and buoyancy engine as claimed in claim 13 comprising:

the buoyancy chamber further comprising a plurality of staging guides;

the plurality of staging guides being mounted onto a lateral sidewall of the buoyancy channel; and the plurality of staging guides being distributed along the buoyancy channel;

the plurality of staging guides protruding into the buoyancy channel; and the plurality of staging guides being positioned offset from the staging door along the buoyancy channel.

15. The gravity and buoyancy engine as claimed in claim 1 comprising:

the buoyant object being configured to enter the gravity chamber and vertical motion transfer assembly via gravity after passing through the buoyancy chamber;

in response to the buoyant object engaging the vertical motion transfer assembly, the buoyant object traversing through the gravity chamber toward the airlock chamber;

in response to the buoyant object moving toward the airlock chamber, the vertical motion transfer assembly providing operating power to the electricity producing system;

the buoyant object being configured to enter the air lock chamber via gravity after passing through the gravity chamber and disengaging the vertical motion transfer assembly;

in response to the buoyant object entering the air lock chamber, the buoyant object rolling along the air lock chamber via gravity so as to open an airlock door;

in response to the buoyant object passing through the airlock door, the airlock door being biased to a closed position;

the buoyant object being configured to enter the buoyancy chamber via gravity after passing through the air lock chamber; and in response to the buoyant object entering the buoyancy chamber, the buoyant object ascending along the buoyancy chamber via buoyancy.

\* \* \* \* \*